United States Patent
Demiryont (10) Patent No.: US 6,805,960 B1
(45) Date of Patent: Oct. 19, 2004

(54) THERMOSTABLE GLAZING

(75) Inventor: Hülya Demiryont, Philadelphia, PA (US)

(73) Assignee: Turkiye Sise Ve Cam Fabrikalari, Besiktas-Istanbul-Turkiey (TR)

( * ) Notice: Subject to any disclaimer, the term of this patent is extended or adjusted under 35 U.S.C. 154(b) by 0 days.

(21) Appl. No.: 09/327,594

(22) Filed: Jun. 8, 1999

(51) Int. Cl.⁷ ................................................. B32B 9/04
(52) U.S. Cl. ........................ 428/432; 428/699; 428/701; 428/702
(58) Field of Search ................................. 428/426, 428, 428/432, 469, 472, 688–689, 699–706

(56) References Cited

U.S. PATENT DOCUMENTS

| | | |
|---|---|---|
| 2,676,117 A | 4/1954 | Colbert et al. |
| 3,720,541 A * | 3/1973 | King |
| 4,170,461 A | 10/1979 | Breininger et al. ............. 65/60 |
| 4,948,677 A * | 8/1990 | Gillery |
| 4,960,324 A | 10/1990 | Brown ........................ 350/357 |
| 5,213,842 A | 5/1993 | Brown et al. ................ 427/168 |
| 5,624,760 A | 4/1997 | Collins et al. .............. 428/426 |
| 5,705,278 A | 1/1998 | Gillery et al. |
| 5,876,854 A * | 3/1999 | Kawazu et al. ............. 428/428 |
| 5,915,780 A * | 6/1999 | Kobrehel et al. |
| 5,942,331 A * | 8/1999 | Miyauchi et al. |
| 6,416,194 B1 * | 7/2002 | Demiryont |

FOREIGN PATENT DOCUMENTS

EP 0 301 755 1/1989

OTHER PUBLICATIONS

European Search Report, dated Sep. 27, 2000, 00112104.5–2111–, Turkiye Sise Ve Cam Fabrikalari A.S.

* cited by examiner

Primary Examiner—Jennifer McNeil
(74) Attorney, Agent, or Firm—Banner & Witcoff, LTD (57) ABSTRACT

A thermostable glazing has a substantially transparent, thermostable solar coating on a surface of a substantially transparent substrate. The solar coating provides high anti-solar performance properties to the glazing even after heat treatment, such as tempering or bending the coated substrate. The thermostable solar coating is formed of copper oxide and may be part of an integrated coating having, e.g., also a coloration coating layer. In accordance with a method of manufacturing the thermostable glazing, the thermostable solar coating is deposited preferably by D.C. magentron cathodic sputtering.

17 Claims, 4 Drawing Sheets

Fig. 6

THERMOSTABLE GLAZING

INTRODUCTION

The present invention is directed to glazing, such as automotive and architectural glazing, and the like, having a solar control coating on a surface of a substantially transparent substrate. More particularly, the present invention is directed to thermostable glazing having a thermostable solar coating on such substrate for anti-solar properties, as well as to methods of manufacturing such thermostable glazing.

BACKGROUND

Coated glazing products having anti-solar properties, that is, low transmittance of wavelengths in the infra-red range, are known to those skilled in the art. Also, low emissivity coatings for glazing products are disclosed, for example, in European patent application 0,104,870 to F. H. Hart entitled Low Emissivity Coatings On Transparent Substrates. That document discloses low emissivity silver coatings comprising a layer of silver and an overlying anti-reflective layer of metal oxide. Cathodic sputtering is disclosed for producing such low emissivity coatings having a small amount of an additional metal dispersed non-uniformly in the silver layer. Sputter deposition of a multi-layer, low emissivity coating is described, for example, in European Patent Application 0,418,435 to Nalepka. Similarly, a multi-layer low emissivity coating is disclosed in European patent application 0,418,435 to Hayward et al. The multi-layer coating of Hayward et al. is said to comprise a layer of sputtered zinc, tin, titanium, indium/tin or bismuth oxide, next a layer of sputtered silver or silver alloy, then a layer of sputtered titanium or stainless steel and finally a layer of zinc, tin, titanium, indium/tin or bismuth oxide. Such multi-layer film is said to have excellent visible light transmission while controlling both near infra-red solar energy and far infra-red reflected energy. A temperable coated article is suggested in U.S. Pat. No. 5,552,180 to Finley et al. The coated article of Finley et al. employs a metal-containing film such as titanium nitride which ordinarily oxidizes at the high temperatures encountered during glass tempering, along with an overcoating of a protective layer of a silicon compound and an undercoating with a stabilizing metal-containing layer. In U.S. Pat. No. 3,990,784 to Gelber a multi-layer coating for architectural glass is suggested, comprising first and second metal layers with a dielectric layer disposed between them. Gelber suggests that the transmission properties of the coating can be changed independent of its reflection properties, by varying the thickness of the metal layers while maintaining the ratio of their thicknesses constant.

In general, conventional low emissivity coating systems employ a first dielectric film or layer directly on a surface of a transparent substrate, followed by metal film and then a second dielectric film over the metal film. Where the metal film employs silver or other easily oxidized metal, a buffer film typically is positioned between the metal and the second dielectric films. The buffer film substantially inhibits migration to the metal film of oxygen or other reactive gas employed in the deposition of the second dielectric film. Conventional dielectric materials include, for example, oxides such as zinc oxide, tin oxide, zinc/tin oxide composites, indium/tin oxide, bismuth oxide, titanium oxide, etc., and nitrides such as tin nitride. Co-pending application U.S. Ser. No. 09/098,316 (Demiryont et al.) discloses a multi-layered coating in which tungsten oxide is employed as a dielectric material. The metal layer may be formed of silver, although other metal layers also are known to those skilled in the art. Suitable buffer layers for protecting a silver or other metal film have typically included, for example, a film formed of sub-oxide of chrome or chrome/nickel or nitride of silicon or titanium with a thickness of, e.g., 15 Å to 60 Å. The thickness of the metal film is selected to provide adequately low emissivity while maintaining sufficiently high transmittance of visible light to meet the requirements of the intended application. The thickness of the bottom and top dielectric films is selected typically to achieve adequate anti-reflectance for the metal film, whereby the entire multi-layer coating has improved transparency to visible light.

Various difficulties have been encountered by those skilled in the art in developing commercially suitable coatings for architectural and automotive glazing. Both architectural and automotive applications require materials able to withstand applied force, e.g., as caused by pressure or temperature gradients between the internal and external surfaces, changes in load resulting from building sway, road vibration, wind or direct impact Typically, window glass employed in vehicles or buildings is 'tempered' or 'annealed', a strengthening process which entails exposure to high temperatures followed by gradual cooling. In glazing for automobiles or trucks, such heating may also be required for bending the glazing (e.g., a windshield, sunroof or other view panel) into a desired shape. Prior art coatings cannot adequately withstand exposure to the high temperatures required for such bending or other heat treatment of a glass substrate, e.g., 570° C. to 610° C. for bending and 600° C.–650° C. for tempering soda-lime-silica glass, unless thermally shielded , e.g., by a protective layer such as a metal layer. That is, they would lose their characteristic solar control optical properties upon exposure to such thermal tempering, and therefore, such prior known solar coatings must be applied after tempering or shaping of the glass substrate. This is particularly disadvantageous in the coating of bent or curved glazing, since specialized equipment must be used in order to apply a coating to a non-flat surface. There is, therefore, need in this technology area for heat-stable or thermostable solar coating in order to allow the easy and inexpensive coating of stock, flat 'blanks' of glass or other transparent glazing material using standardized coating equipment, such that coated material may be produced and stored for future custom processing (i.e. tempering and/or bending).

There has long been need in the glazing industry for a solar coating which can be uniformly deposited by D.C. magentron sputtering onto large surface areas with fast deposition rates, low deposition power density, good film quality, including high film durability and long shelf life. As used here, large area deposition refers to deposition onto transparent substrates suitable in size for architectural and automotive glazing applications. Fast deposition rate is desirable, since it can reduce the time and cost of producing the coated articles. Long lasting source material to deposit reproducible films also is desirable. Low deposition power density is desirable both to reduce the cost of energy employed in manufacturing the coated article and to provide more uniform coating thickness and density. The reference here to a coated substrate having long shelf life is intended to mean, especially, that the coated surface can be exposed to air for hours or even days without substantial degradation of film quality, for example, due to migration of oxygen or moisture from the air into the coating to react with the coating materials. In that regard, in prior known manufacturing processes substantial production wastage occurs when a coating on a glazing panel deteriorates significantly if it is not immediately laminated or otherwise assembled into a multi-pane window which protects the coating from exposure to air. Increasing the time period during which a coated glazing panel can be stored prior to being laminated or assembled in this fashion provides significant production flexibility and consequent reduction in processing cost and complexity.

It is an object of the present invention to provide thermostable glazing meeting some or all of these long-felt industry needs. In particular, it is an object of at least certain preferred embodiments of the invention to provide thermostable glazing comprising a substantially transparent substrate with a substantially transparent solar coating on a surface of the substrate, which coating has high film durability, long shelf life, and can additionally withstand post-deposition heat treatment at the substrate's bending and tempering temperatures.

It is a further object of the invention to provide methods of manufacturing the aforesaid thermostable glazing.

Additional objects and advantages of the present invention will be readily understood by those skilled in the art given the benefit of the following disclosure of the invention and detailed description of certain preferred embodiments.

SUMMARY

In accordance with a first aspect of the invention, thermostable glazing comprises a substantially transparent substrate with a substantially transparent thermostable solar coating on a surface of the substrate. The thermostable solar coating is formed of copper oxide. In accordance with preferred embodiments, the thermostable glazing unit has visible transmittance ranging between 5% and 50% and comprises a substantially transparent substrate with a substantially transparent, thermostable solar coating on a surface of the substrate. The substantially transparent thermostable coating is formed of copper oxide, as disclosed above. Optionally, the $CuO_x$ solar coating is combined with other coating layers, for example, an anti-reflection coating layer, a coloration coating layer, etc., which also are thermostable, in an integrated coating on the surface of the glazing substrate. The term "integrated coating" means an optical coating in accordance with the present disclosure, wherein the thermostable solar coating has not only the copper oxide layer, but also at least one other coating layer lying directly over or under the copper oxide layer. An integrated coating in accordance with certain preferred embodiments, for example, may have an anti-reflection layer deposited directly on the surface of the substrate prior to deposition of the copper oxide thermostable coating, such that the anti-reflection coating layer is sandwiched between the glass substrate and the copper oxide layer: The copper oxide layer and the anti-reflection layer together in such embodiment form one integrated coating on the substrate surface.

A "solar coating" as that term is used here, is a substantially optically transparent coating which reduces transmittance of total solar energy through a glass or other pane which carries the solar coating, by at least about 5%, preferably 5% to 50%, for example, about 15%, as measured by a Perkin Elmer Model Lambda 900 UV-Vis-Near IR spectrophotometer. Performances of the coating are calculated by a standard Window 4.1 program prepared by LBL Window and Daylight Group for the U.S. Department of Energy. Film thicknesses are measured by a Tencor Model Alpha step 500 thickness measuring apparatus. Mechanical properties of the samples are determined by a Taber Abraser machine. Environmental stability of the samples are evaluated by using a whedering cabin controlling ambient temperature and humidity. The solar coatings disclosed here are substantially transparent to visible light, preferably having at least about 10% transmittance, more preferably at least 20% transmittance, as measured by a spectrophotometer.

The solar coatings disclosed here are thermostable in that, when subjected to thermal stress, they are resistant, against degradation, most notably in their capacity to block or transmit light. In addition, the term "thermostable" refers to a coating or coated article of manufacture which substantially retains its characteristic mechanical properties, such as body integrity, surface continuity, tensile strength and adhesiveness (e.g., between coating and substrate). The term "thermal stress" is herein taken to mean the stresses encountered upon exposure to high temperatures used for heat treatment, e.g., for tempering or bending the glazing substrate. Typically, such temperatures are in the range of 590° C. to 650° C. The solar coatings of the invention are thermostable at the tempering temperature of the glazing substrate and/or at its bending temperature.

Preferably, the copper oxide coating is directly on the surface of the substrate. The copper oxide layer forming the thermostable solar coating of the present invention, particularly if used as a mono-layer or single coating (that is, directly on the surface of the substrate with no other coating layers of other materials), preferably has a substantially uniform film thickness of about 150 Å to 3000 Å, more preferably about 1000 Å to 2000 Å. For example, when used on 5 mm thick soda-lime-silica glass for a so-called "moon roof" in a motor vehicle, a thermostable solar coating formed of a mono-layer of copper oxide without any other adjacent coating layers, preferably is about 1200 Å mm thick. When used with auxiliary coating layers, that is, layers of other materials in the same film stack, the copper oxide layer may be the same because optical performance of the solar coating is mainly controlled by the $CuO_x$ film.

As used herein, in reference to a substantially transparent substrate used in the invention or a coated article of the invention, the term "color" refers to that which, when held up before the eye of an observer, causes the spectrum of visible light seen by the observer to be noticeably altered.

As used here and in the appended claims, the substantially transparent, thermostable coating is said to be "directly on" or to "directly overlie" the substrate if no other material or coating is positioned between them. In this regard, the coating may be said to lie directly on the substrate notwithstanding that there may be a slight transition zone between the them, involving migration of the material of the coating into the substrate and/or interface reaction products different from the primary composition of the substrate and the coating.

In preferred embodiments the substantially transparent substrate is a flat or curvo-planar pane of glass, glass ceramic, plastic or glass-plastic composite. It is highly preferred that the substantially transparent substrate be a panel of a glass selected from the group consisting of soda-lime-silica glass, borosilicate glass, aluminosilicate glass, vycor, fused silica and vitreous silica. It is particularly preferred that the glass be soda-lime-silica glass.

Optionally, the transparent glazing substrate has color. The color of an article of manufacture of the invention (i.e. before and after heat treatment) are calculated using the Commission Internationale de L'Eclairage (CIE) color difference equation:

$$E=[(L^*)^2+(a^*)^2+(b^*)^2]^{1/2}$$

where a*, b* and L* are color coordinates in CIE uniform color space. According to certain preferred embodiments, the glazing substrate is a panel of body-colored glass. The term "body-colored glass" refers to glass which, in the form of a pane as used in the present invention, imparts optically perceptible color to sunlight viewed through the glazing along a line of sight substantially normal to the plane of the glass. The color is optically perceptible if it is perceptible to the unaided human eye. Glazing substrates suitable for the present invention, such as soda-lime-silica glass, can be given body color by incorporating any of numerous suitable colorance materials, such as iron oxides, e.g., CoOx, CrOx, and MnoX. Given the benefit of this disclosure, numerous other suitable colorants and suitable amounts thereof will be readily apparent to those skilled in the art without undue experimentation. It should be recognized that such colorants and other suitable additives to the glass composition can contribute to the solar management properties of the glass. For example, iron-oxides can reduce transmittance of infrared and ultraviolet light. Thus, in accordance with certain preferred embodiments, thermostable glazing is provided which has a copper oxide coating, as disclosed above, along with body colorant materials in the glass for further reduction of UV and IR light, etc., without undue or unacceptable reduction of visible light transmittance. In that regard, it will be recognized by those skilled in the art that surface conditions and interfacial conditions may exist in the thermostable glazings disclosed here, without departing from the invention. For example, residuals from fining aids and/or other processing materials added to the glass during its manufacture, and for example, reaction products and/or migratory materials resulting from the "flute" process used to prepare typical glass substrates, may exist in the thermostable glazings of the invention and may contribute coating disclosed here, for example, during the coating process and/or during subsequent heat treatment of the coated glazing. All such residuals, migration and reaction products are meant to be included by implication in the thermal glazings disclosed and described here, and likewise, included by implication in the products and processes defined in the appended claims. According to other preferred embodiments, the glazing has a color control layer. Preferably, the color control layer has a thickness less than 700 Å and comprises material selected from thermostable oxides or nitrides, e.g., $SnO_2$, WO3 and Si3N4. It is preferred that the color control layer lies directly over or under the copper oxide layer of the solar coating.

As noted above, certain preferred embodiments of the invention further comprise an anti-reflection layer. Preferably, any such anti-reflection layer forms an integrated coating with the copper oxide thermostable solar coating. Suitable materials for an anti-reflection coating layer include, for example, WO3, $SnO_2$ and Si3N4. Such anti-reflection layers typically have a thickness of approximately 50 Å to 2000 Å, more preferably 200 Å to 1000 Å, for example, 400 Å. Other suitable anti-reflection materials and thicknesses will be readily apparent to those skilled in the art given the benefit of this disclosure. Furthermore, it will be understood from this disclosure by those skilled in the art, that any such anti-reflection layer, color control layer and/or other coating layers included in an integrated coating with the copper oxide thermostable solar coating should also be substantially thermostable. That is, they should be at least sufficiently thermostable that they can withstand heat treatment of the substrate, such as tempering or bending, and contribute the desired optical properties, two of the glazing product after such heat treatment. Typically, in preferred embodiments, the copper oxide layer employed in the thermostable solar coating and any other coating layers preferably have substantially uniform film thickness. The term "substantially uniform film thickness" and like expressions used here are intended to mean uniform to the degree needed for the intended purpose of the coating. In that regard, those skilled in the art will recognize that certain tolerable variations in film thicknesses occur naturally, including color for example, variations in film thickness between the center and the edges of a coated substrate.

In accordance with another aspect, methods are provided for making the thermostable glazing disclosed above. Such methods comprise providing a substantially transparent substrate, typically with appropriate surface preparation steps being performed on the surface to be coated. Typically, cleaning of the substrate is the first step prior to deposition. The thermostable solar coating is then formed on the surface of the substrate by depositing a layer of $CuO_x$. The $CuO_x$ solar coating can be deposited directly onto the surface of the substrate. In alternative embodiments, the method further comprises the step(s) of depositing a coloration coating layer for color control of the glazing, and/or an anti-reflection coating layer and/or other thermostable coating layers to form an integrated coating on the substrate surface with the $CuO_x$ solar coating. It is preferred that the step of depositing the coloration coating layer comprises sputtering a material selected from WO3, $SnO_2$ and Si3N4 and the like to a thickness of about 600 Å. Preferably, the method further comprises the steps of washing and substantially drying the surface of the substrate.

In accordance with preferred embodiments, the substantially transparent copper oxide solar coating of the present invention is deposited by sputtering in one or a series of sputter stations arranged sequentially in a single sputtering chamber through which the transparent substrate passes at constant travel speed. Suitable partitions, such as curtains or the like, separate one sputter station from the next within the sputtering chamber, such that different deposition atmospheres can be employed at different stations. A reactive atmosphere comprising oxygen can be used, for example, at a first station to deposit the copper oxide solar coating.

D.C. Magentron sputtering has been utilized for the deposition of metals and some metallic oxides (e.g., $SnO_2$, $Bi_2O_3$, ZnO and, in the above-referenced copending application, tungsten oxide); however, the large-area deposition of $CuO_x$ as an optical coating is a novel process. Sputtering of $CuO_x$ onto glass produces a brown film which is stable after heat treatment, e.g., at 635° C. Such $CuO_x$ films are far more durable than sputtered tin films, even when a heat-treated $CuO_x$-coated object is compared to a tin film which has not undergone thermal stress. A single-layer $CuO_x$ solar coating exhibits transmittance which is inversely proportional to film thickness. Thus, a graded series of thicknesses ranging from 220 Å to 1500 Å produces a corresponding series of film transmittances ranging between 40% and 11%. It is preferred that the substantially transparent substrate is soda-lime-silica glass and the method further comprises the step of tempering or otherwise heat treating the substrate.

In accordance with certain highly preferred embodiments of the manufacturing method disclosed here, the substantially transparent thermostable coating is deposited by multiple passes, preferably two passes through such multi-station sputtering chamber. Repeating of deposition means increasing the film thickness by multi-pass of the substrate under the depositing target, so the visible light transmittance is reduced. During each of the passes through the sputtering chamber, a layer is deposited comprising copper oxide. Thermostable optical coatings formed in accordance with such multi-pass methods of the invention are found to have substantially improved coating properties, including especially to form a pin-hole free coating. Pinhole free coatings are very important for longer life time and better film quality/durability. It will be within the ability of those skilled in the art, given the benefit of this disclosure, to achieve both enhanced uniformity and desired hue or color of the coated article. Reference here to uniformity of color refers to reduction in blotchiness or the like which may otherwise appear in a coated article.

The thermostable solar coating of the invention substantially retains its reflective and refractive properties after post-deposition heat treatment. A sheet of substrate material may, after coating, be subjected to temperatures suitable for bending or tempering without substantial degradation of reflectance or transmittance properties. Bending of a typical sheet of architectural or automotive glass (e.g., a 4 mm thick sheet of soda-lime glass) requires 15 minutes heating to 550° C. and then for approximately 2 minutes to 600° C. for bending and then cooling over a 15 minute time period to room temperature after bending. To produce tempered glass, a glass substrate is heating to approximately 635° C. and then subjected to surface chilling, such that the material cools to room temperature within two minutes and is compressed relative to the untempered material. This compression results in enhanced performance of the glass when it is under mechanical stress.

It will be apparent to those skilled in the art in view of the present disclosure, that the present invention is a significant technological advance. Preferred embodiments of the substantially transparent, thermostable, dual-function coatings disclosed here have excellent performance characteristics, including advantageously high anti-solar properties, that is, high attenuation levels of direct solar radiation. The above-disclosed copper oxide coating is a novel coating which is highly suitable for large area deposition by sputtering and which allows a coated substrate of standard composition and dimensions to be heat-treated for strength and/or fashioned into any desired shape after months, or even years, of storage. Fast deposition rates can be obtained with copper oxide, even employing advantageously low deposition power densities. In addition to the high durability and long shelf-life of the coating of the invention, copper is inexpensive relative to metals used in solar-control coatings of the prior art and deposition of the coating layers may be performed at room temperature, obviating any need for controlled-temperature sputtering chambers. It is particularly advantageous that the copper oxide layer can be formed by reactive sputtering from a pure copper target with little or no target poisoning.

The copper oxide coating of the present invention has a high refractive index similar to amorphous Si, being about 3.5 in the mid-visible wavelength range. The copper oxide, solar coatings disclosed here provide desired spectral performance characteristics at thicknesses less than that required for other known solar coatings, such as CoOx and CoOx—FeOx which are known pyrolytic privacy coatings for automotive windows. Although these privacy glasses are temperable and good for side windows, the pyrolytic coatings cannot reach the desired low visible transmittance (10%–15%) because of their limited coating thicknesses. The thickness of the $CuO_x$ layer of the present invention can be controlled by selecting a suitable number of passes through the sputter deposition chamber, or by adjusting the travel speed of the glass under the spatter targets during deposition. Deposition of the copper oxide layer employed in the coatings disclosed here can be accomplished faster and more economically. As noted above, faster production speeds can yield corresponding reductions in production costs. In addition, the high density of the copper oxide anti-reflection layer employed in the thermostable coatings disclosed here, which is found to be as high as bulk value or nearly bulk value results in long shelf like and excellent durability.

In addition, the copper oxide anti-solar layer has an advantageously low absorption coefficient in the visible and infra-red regions, together with an advantageously high refractive index. The optical properties of the $CuO_x$ films are essentially the same as those of Si films; refractive index is 3.5 and extension coefficient 0.03. Table I gives process parameters of $CuO_x$ films vs. resulting film properties e.g., film thickness, Tvisible/Ttotal solar for single pain and double pain glass (6 mm clear float glass and 6 mm–12 mm air–6 mm for double pain). Table II is the optical performance table of the some typical samples. In short, the copper oxide layer of the thermostable, anti-solar coatings disclosed here has advantageous thermal and spectral properties, robust deposition properties and excellent mechanical film properties.

Additional features and advantages will be further understood in view of the following detailed description of certain preferred embodiments.

BRIEF DESCRIPTION OF THE DRAWINGS

Various preferred embodiments of the coated article of manufacture and method of manufacture disclosed above are discussed below with reference to the appended drawing in which.

Figure 1:
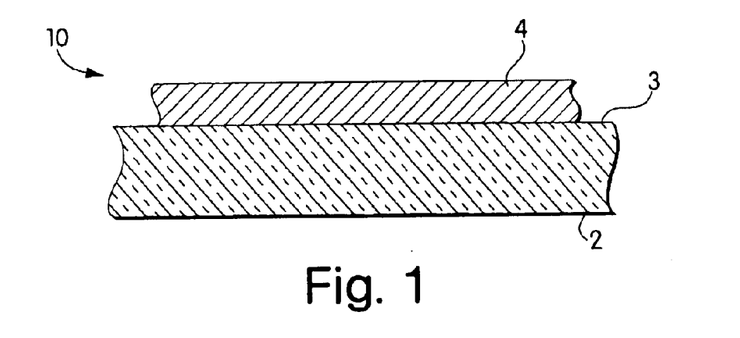
FIG. 1 is a schematic cross-sectional view of a coated article of manufacture according to a first preferred embodiment.
Figure 2:
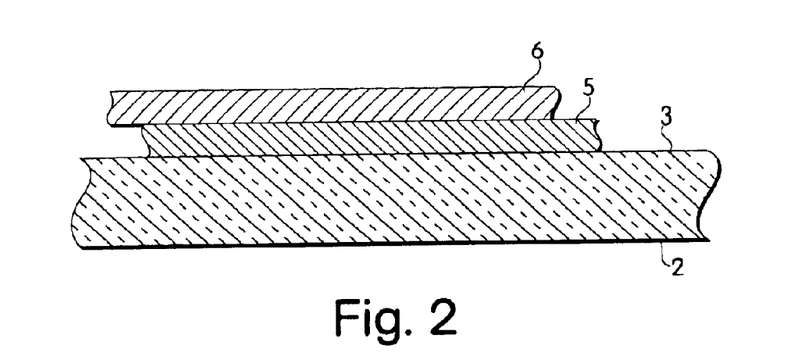
FIG. 2 is a schematic cross-sectional view of a coated article of manufacture according to a second preferred embodiment, wherein the article depicted in FIG. 1 further comprises a color-control layer.
Figure 3:
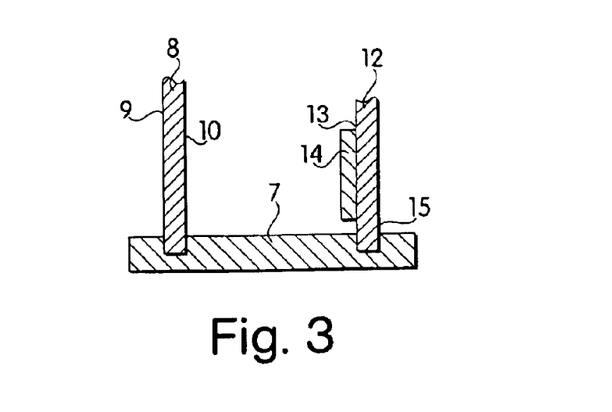
FIG. 3 is a schematic illustration of a multi-pane glazing system in accordance with a preferred embodiment, having a single-layer coating of $CuO_x$ on surface No. 2 of the glazing panes.

It should be understood that the schematic illustrations in FIGS. 1–3 are not necessarily to scale. In particular, the thickness of the copper oxide layer forming the substantially transparent thermostable coating and, where present, the optional color control layer are increased relative the thickness of the substrate for the purpose of clarity and ease of illustration.

DETAILED DESCRIPTION OF CERTAIN PREFERRED EMBODIMENTS

It will be apparent to those skilled in the art, given the above disclosure and the following detailed description, that the coated articles disclosed here, comprising a substantially transparent substrate carrying a substantially transparent, thermostable, multi-function solar coating, have numerous commercially significant applications.

For ease of discussion, the following detailed description of certain preferred embodiments will focus primarily on articles suitable for automotive or architectural glazing applications, such as a sunroof or skylight. It will be within the ability of those skilled in the art, given the above disclosure and this detailed description, to employ the invention in alternative applications.

Referring now to FIG. 1, a coated article 10 is seen to comprise a substantially transparent substrate 2 having a main surface 3 carrying a substantially transparent coating 4. Coating 4 is a multi-functional thermostable solar coating in accordance with the above disclosure, that is, it allows for post-deposition heat treatment at the bending or tempering temperature of the substrate, and provides anti-solar performance characteristics for the coated article. Coating 4 consists of a mono-layer of $CuO_x$ directly on surface 3. It should be understood that all references here and in the appended claims to the copper oxide, unless otherwise clear the context of any particular instance of its use, are intended to mean an oxide of copper, $CuO_x$, where x can vary from about 0.5 to about 1. The substantially transparent coatings of the present invention which employ copper oxide in sufficient film thickness will have a yellow to brown tint or coloration. In general, thicker $CuO_x$ films will result in more coloration of the coated article. Typically, as the thickness of the substantially transparent substrate increases, the preferred thickness of the copper oxide layer increases. The resultant excellent mechanical film properties, including low moisture absorption, along with excellent thermal and spectral properties, including low absorption coefficient in the visible region along with high refractive index, contribute significantly to the unexpected overall efficacy and advantages of the present invention. In preferred embodiments intended for architectural or automotive glazing applications, the copper oxide layer preferably has a thickness of about 150 Å to 1500 Å.

As noted above, it will be within the ability of those skilled in the art, given the benefit of the present disclosure and detailed description of various preferred embodiments, to select a thickness for the thermostable, copper oxide optical coating of the invention such that it is adapted to meet the particular performance characteristics needed for a particular intended application.

In accordance with certain preferred embodiments, the coated article 1 is subjected to a tempering or bending step subsequent to deposition of the coating 4. Unlike prior art coatings, the coating illustrated in FIG. 1 requires no additional protection layer of metal or other material to shield it during exposure to the high temperatures required for tempering or bending glass or other transparent substrate intended for architectural or automotive applications.

A coated article of the invention may be essentially colorless or may be colored. Color is, in part, dependent upon the thickness of the copper oxide layer, as noted above. Colorless films generally have a thickness less than 100 Å. In addition, color may be imparted to the coated article through the use of a body-colored substrate or through the deposition of a color control layer comprising a material other than copper oxide to the article. Such a layer may be deposited on either face of the substrate, although for convenience of manufacture it is preferable to deposit both the $CuO_x$ coating and the color control layer on the same surface of the substrate. The $CuO_x$ coating and the color control layer may be deposited in either order.

FIG. 2 presents a particularly preferred embodiment, in which color control layer 5 is deposited directly upon the surface 3 of the substrate 2 and $CuO_x$ layer 6 is deposited directly upon color control layer 5. Exemplary materials for color control layer 5 include $SnO_2$, WO3, ZnO and Si3N4 and other suitably thermostable materials. Other suitable color control layer materials will be apparent to those skilled in the art given the benefit of this disclosure. The color control layer typically will be about 100 Å to 1500 Å thick, depending on the material selected to form the color control layer and the degree of color desired. It will be within the ability of those skilled in the art, given the benefit of this disclosure, to select suitable color control layer materials and thicknesses.

Preferred embodiments of the coated articles disclosed here can be prepared in accordance with various suitable techniques employing commercially available equipment and materials. Preferably, the substantially transparent, thermostable coating is formed on the surface of the substantially transparent substrate by cathodic sputtering. Thus, in manufacturing the embodiment of FIG. 1, for example, the substrate passes through a sputtering station where a layer of $CuO_x$ is deposited by cathodic planar sputtering onto the surface of the substrate. Depending on the substrate travel speed, deposition parameters, and the thickness of desired solar control layer, one, two or more sputtering stations can be used to deposit successive sub-layers of the same $CuO_x$ coating material. In this way, one can achieve shorter deposition cycle time. Preferably, the substrate moves continuously through the chamber, such that the $CuO_x$ is deposited onto the substrate as it is traveling. While the individual stations are typically isolated by curtains or other suitable partition means, such that the reactive atmosphere employed at a first sputtering station does not contaminate a non-reactive atmosphere which may be employed at an adjacent station, such partitioning is not necessarily required in the production of a coated article of the invention. Suitable multi-station sputter deposition chambers are commercially available, including pilot plant size coaters, for example, Model Z600 from Balzers Process System GmbH, D-63755, Alzenau, Germany, and full commercial scale coaters, for example, Interpane 1993 model Coater available from Interpane Glass Industrie AG, Sohnr Eystasse 2137697 Lauenf örde, Germany. Table A gives the typical process parameters for Model Z600 pilot plant coater and for an Interpane 1993 Model production coater.

| Parameters | Z600 | Interpane |
|---|---|---|
| Maximum Substrate Dimensions, cm | 40 × 50 | 600 × 320 |
| Background Pressure, $mbar(10^{-5})$ | 5 | 5 |
| Power Density (Watt/$cm^2$) | 0.2–5 | 0.2–5 |
| Working Pressure, $mbar(10^{-3})$ | 1.5–4 | 2–7 |
| Argon, sccm | sputter | sputter |
| Oxygen, sccm | 0–120 | 0–150 |
| Nitrogen, sccm | 0–120 | 0–180 |

Advantageously, such preferred multi-station sputtering chambers employ sputter targets which are wider than the transparent substrates being coated and are mounted in a direction extending perpendicular to the travel direction of the substrate. In preferred embodiments employing sputtering targets wider than the substrate, advantageously small throw distances can be used without sacrificing uniformity of deposition. It will be within the ability of those skilled in the art to select suitable deposition conditions and parameters for cathodic planar sputtering of the copper oxide solar control/coating disclosed above for the transparent coated articles of the present invention. The following deposition parameters are suitable for a typical deposition process to produce a dual-function copper oxide coating on a soda-lime-silica glass substrate 40 cm wide by 50 cm long traveling at a rate of 2 meters per minute through the sputtering chamber.

1. The sputtering chamber is initially evacuated to about $5 \times 10^{-5}$ millibar and then raised to an operating pressure of approximately $3 \times 10^{-3}$ millibar by the injection of operating gases at the various sputtering stations.

2. Copper oxide is deposited by cathodic sputtering from a pure copper target in an operating atmosphere of $0.2 \times 10^{-3}$ millibar with an Argon/Oxygen flow rate ratio of 40/50, at a power level of about 1 to 5.5 Watts/$cm^2$. The throw distance from the copper target to the substrate is typically about 5 to 15 cm.

It has been found that, generally, multi-pane glazing systems employing the thermostable anti-solar coating of the present invention provide best results when the coating is placed at the second surface as illustrated in FIG. 3. The glazing unit of FIG. 3, shown partially broken away, has a frame 7 holding first pane 8 of soda-lime-silica glass 6 mm thick, having an outside first surface 9 and an inside second surface 10. A second pane 12 of soda-lime-silica glass is spaced 12 mm from pane 8 and has a surface 13 facing first pane 8 and carrying a thermostable, multi-function solar control coating 14 consisting of a mono-layer of $CuO_x$ in accordance with a preferred embodiment of the present invention. Second pane 12 also has outside surface 15 serving as the fourth surface of the double-pane glazing. It has been noted that double pane glazing units are suitable for architectural applications, with surface 15 facing the exterior of the building, etc, and surface 9 facing the interior. Surface 13 of the multipane glazing unit, which carries the solar coating in the preferred embodiment of FIG. 3, is generally referred to as surface No. 2 of the glazing unit.

$SC_c$ is the shading coefficient;

$SHGC_c$ is the solar heat gain coefficient;

L, a and L are known solar coordinates;

TL, T*a and T*b are transmittance values for color coordinates L, a and b, respectively;

RL, R1a and R1b are reflectance values (for surface No. 1, as indicated) for color coordinates L, and a and b, respectively;

TABLE 1

| Example Identification Number | $CuO_2$ Solar Control Film Thickness | Tv/Total Solar (Single Pane) | Tv/Total Solar (Double Pane) | Process Parameters ||||
|---|---|---|---|---|---|---|---|---|
| | | | | Ar (SCCM) | O (SCCM) | Power (KW) | Number of Passes | Travel Speed (M/min) |
| 1095 | 1530 | 11/43 | 10/33 | 40 | 50 | 1.5 | 3 | 0.2 |
| 1094 | 1100 | 19/45 | 17/34 | 60 | 50 | 1.5 | 3 | 0.3 |
| 1092 | 690 | 27/47 | 25/37 | 40 | 50 | 1.5 | 3 | 0.5 |
| 1091 | 480 | 34/53 | 30/43 | 40 | 50 | 1.5 | 2 | 0.5 |
| 1090 | 220 | 40/59 | 36/48 | 40 | 50 | 1.5 | 1 | 0.5 |

TABLE 2

| Sample Identification Numbers | Tsol | Rsol 1 | Rsol 4 | Tvis | Rvis 1 | Rvis 4 | $U_{winter}$ | $U_{summer}$ | SCc | SHGCc | RHG | Tv/SHGcc | TL | T*a | T*b | RL | R1a | R1b |
|---|---|---|---|---|---|---|---|---|---|---|---|---|---|---|---|---|---|---|
| 1090 | 0.371 | 0.149 | 0.213 | 0.364 | 0.201 | 0.313 | 2.760 | 3.25 | 0.56 | 0.48 | 376 | 0.76 | 66.4 | 0.88 | 9.70 | 52.0 | −2.00 | |
| 1091 | 0.326 | 0.205 | 0.247 | 0.304 | 0.280 | 0.358 | 2.760 | 3.24 | 0.5 | 0.43 | 339 | 0.71 | 61.5 | 0.67 | 11.70 | 59.6 | −1.80 | 6.46 |
| 1094 | 0.229 | 0.168 | 0.216 | 0.167 | 0.091 | 0.218 | 2.760 | 3.29 | 0.4 | 0.34 | 227 | 0.49 | 46.6 | 9.11 | 29.10 | 36.7 | 0.68 | −8.90 |
| 1095 | 0.210 | 0.142 | 0.210 | 0.101 | 0.148 | 0.275 | 2.760 | 3.31 | 0.38 | 0.33 | 269 | 0.31 | 36.7 | 10.20 | 29.60 | 45.4 | −4.80 | 3.96 |

The present invention is further disclosed by the following examples, which are intended for purposes of illustration and not limitation.

EXAMPLES

The following examples illustrate thermostable, multi-function solar coated articles according to the invention, and their manufacture. Listed in Table 1, below, are the process parameters used in preparing glazing units with $CuO_x$ film thicknesses for each example, along with the solar control properties $T_{vis}$ and Total solar, i.e., the percent transmittance of visible light and the percent of total solar energy transmittance. For each example, the solar control values are given for a glazing unit formed of the single coated pane and for a glazing unit as depicted in FIG. 3, with the coated pane spaced 12 mm from another, uncoated pane which is also 6 mm thick soda-lime-silica glass.

Table 2 shows additional optical performance values for some of the examples of Table 1 (in the double glazing embodiments). In Table 2, "T" values are transmittance values and "R" values are reflectance values:

$T_{sol}$ is transmittance of solar energy;

$R_{sol}1$ is reflectance of total solar energy measured at surface No. 1 (i.e., surface 15 in FIG. 3, the exterior surface);

$R_{sol}4$ is reflectance of total solar energy measured at surface No. 4 (i.e., surface 9 in FIG. 3, the interior surface);

$T_{vis}$ is transmittance of visible light;

$R_{vis}1$ is reflectance of visible light at surface No. 1;

$R_{vis}4$ is reflectance of visible light at surface No. 4;

In each of the following examples, a soda-lime-silica glass panel 30 cm wide by 30 cm long by 6 mm thick was passed through a multi-station sputtering chamber, Model Z600 available from Balzers Process System. At the same time, for visual inspection, measurement and characterizations, a 5 cm wide by 5 cm long by 6 mm thick glass test piece was also coated in the same system. The glass panel traveled in each case through the sputtering chamber at the travel speed shown in Table 1. Immediately prior to entering the sputtering chamber, the glass panel surface to be coated was washed with demineralized water (max 5 microsiemens) and substantially dried by pressurized air. For each of the examples, the sputtering conditions are recited in Table 1, and resulted in $CuO_x$ films wherein x was approximately 0.7. In the case of a double-layer or multi-layer structure, as disclosed above, the deposition conditions preferably would be selected for each deposition station so that desired films are deposited one on the other during a single pass.

The spectral properties were measured for the resultant coated article of each example. A Perkin Elmer Model Lambda 900 UV Vis NIR spectrophotometer was used to measure the optical performance of each sample, over the 350 nm–2100 nm spectral region. The spectral averages of the visible region and other performance and color information shown in the Tables and in the drawings were determined by the "Window 4.0", and $U_{winter}$ and $U_{summer}$ were calculated using the "Window 4.1" calculation program, both publicly available from the USA Department of Energy. These "U" values are a measure of overall conductance of the thermal energy in terms of Watt/$m^2$ K, calculated using the following table:

| Name | | Outside Temp (° C.) | Inside Temp (° C.) | Wind Speed (m/s) | Wind Direction | Direct Solar (W/m$^2$) | $T_{sky}$ (° C.) | $E_{sky}$ |
|---|---|---|---|---|---|---|---|---|
| $U_{winter}$ | Uvalue | −17.8 | 21.1 | 6.7 | 0 Windward | 0.0 | −17.8 | 1.00 |
| | Solar | −17.8 | 21.1 | 6.7 | 0 Windward | 0.0 | −17.8 | 1.00 |
| $U_{summer}$ | Uvalue | 31.7 | 23.9 | 3.4 | 0 Windward | 783.0 | 31.7 | 1.00 |
| | Solar | 31.7 | 23.9 | 3.4 | 0 Windward | 783.0 | 31.7 | 1.00 |

In addition, the $R_s$ surface resistance was measured by a Signatron four probe, and emissivity, e was measured by an IR spectrometer and calculated from the following equation:

$$e=1-(1/((1+0.0053)\times R_s))^2$$

Ref.: K. L. Chopra, S. Major, D. K. Pandya. It was found that measured and calculated values fit well with each other for the films having surface resistance $R_s$ less than 10 Omhs. The shading coefficient, sc, was calculated as the performance ratio, $T_{vis}/T_{solar}$, and was used to determine the quality of the coatings. The theoretical limit of the $T_{vis}/T_{total}$ solar ratio is 2.15.

Post-deposition tempering of coated sheets was performed at 635° C., Glasteck Tempering equipment Model CRB was used to temper the coated glasses. The tempering cycle comprises heating, quenching, and colling zones. The glass was heated to 635° C. within 150 sec. then quenched to 180° C. within 3–6 sec. and then passed into a cooling zone in which it reached 25° C. within 3 min. Bending of coated substrate sheets was performed 570° C. to 620° C. after heating for 15 min. in a Lamino Model SWB convectional bender, followed by bending of the heated substrate and cooling of the shaped, coated objects to room temperature. The bending equipment has three zones. In the heating zone the coated glass was heated for 15 min. The glass was then bent in the bending zone for 2 min., and then cooled in the cooling zone for 15 min. to a temperature of 45° C.

Qualitative analysis of the spectral properties of objects coated according to the invention and then subsequently heat treated was performed as described above for coated sheets which were not subjected to post-deposition thermal stress. The properties of tempered and non-tempered substantially transparent objects coated according to the invention were then compared.

In each example, the single layer coatings of copper oxide was deposited directly into a first glass substrate surface by sputtering from a pure copper target at 3.5 Watts/cm$^2$ in an atmosphere of Argon and Oxygen gasses, with Argon and Oxygen flow rates of 40 sccm and 50 sccm, respectively at a vacuum level of 3.10−3 mbar. The reflectance (R') of the coated panes was blue-green in appearance. Optical performances, including color properties of the samples are shown in Table 2.

Figure 4:
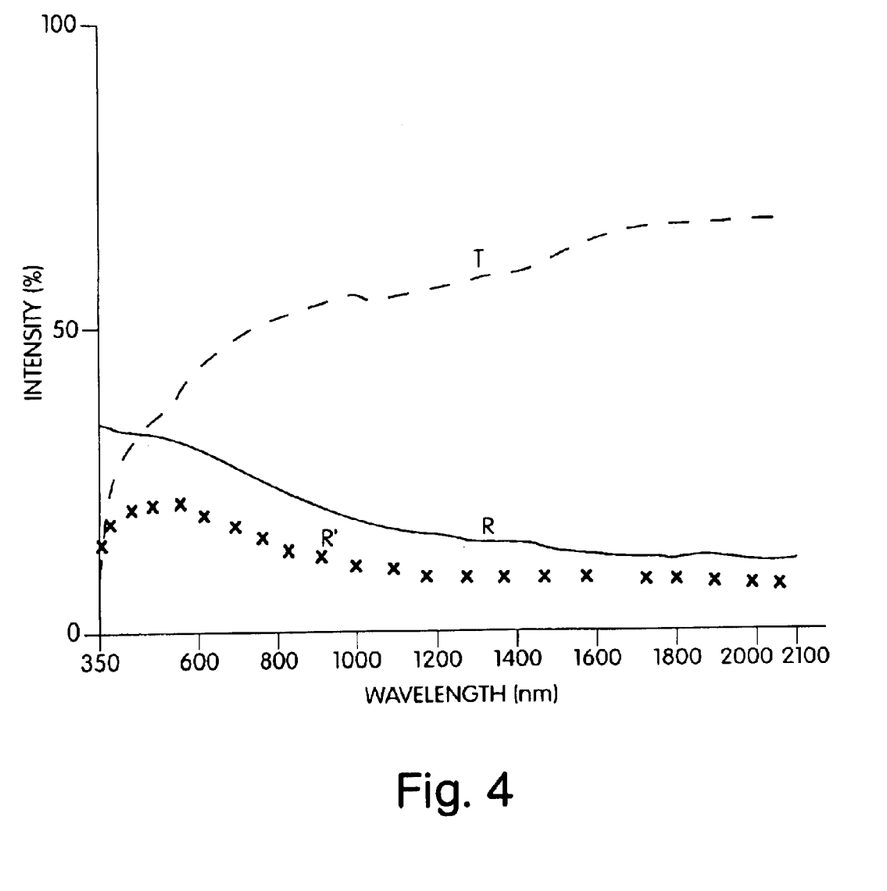
FIGS. 4–5 are graphical representations of the spectral properties of various preferred embodiments (#1090 and #1095) described in Examples 1 and 2, respectively.

The glazing panels of these examples are thermostable, multi-function solar control panels in accordance with the present invention. Each can be stored for months or even years without substantial degradation of the CuO$_x$ coating. It can then be used as is or subjected to heat treatment, such as tempering or bending for use as an automotive "moon roof" or other automotive or architectural glazing. Table 1 compares Tv/Ttot. sol. ratio of the samples for signle pane and double pane conditions. It can be seen that double pane embodiments have about 20% better performance in terms of total energy transmission. Spectral properties for one of the samples, Sample Identification No. 1095, are shown in FIG. 4. Specifically, transmittance percentage T, reflectance percentage from the coated surface side R, and reflectance percentage from the opposite surface R' are shown as a function of wavelength in FIG. 4 over the 350 nm to 2100 nm spectral range.

Figure 5:
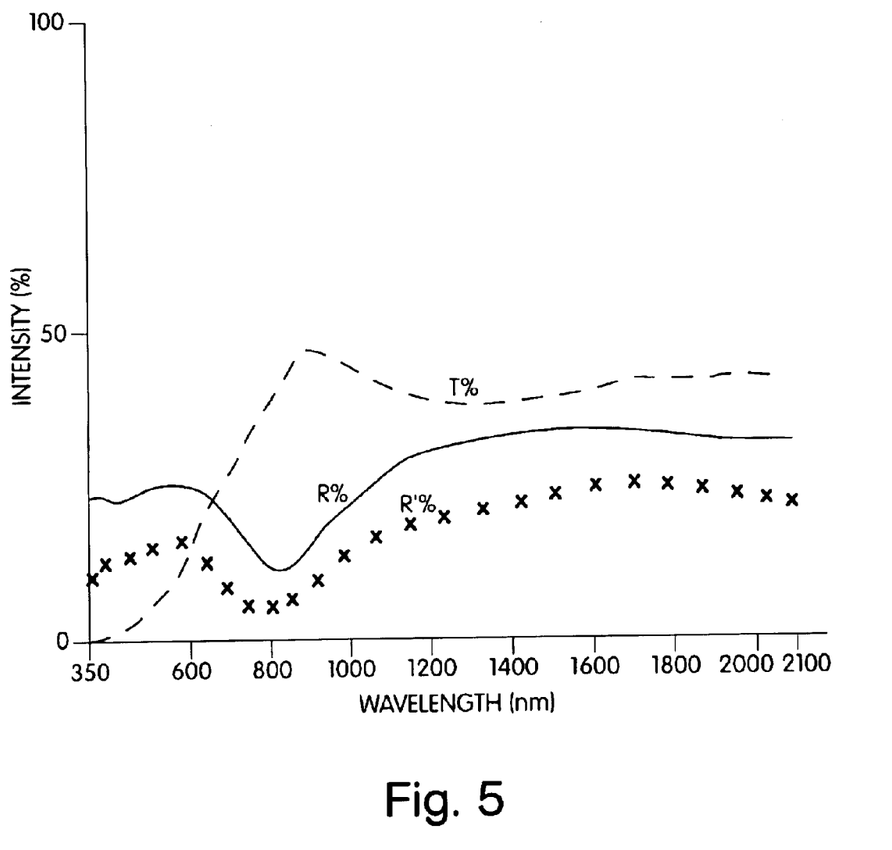

Heat Treatment—A glass panel as prepared in Sample No. 1095, was subjected to post-deposition thermal processing. Specifically, it was tempered and bent at temperatures reaching a maximum of 635° C. The spectral properties of the tempered and bent glazing were found to be substantially the same for heat treated and as deposited samples. The R, R' and T spectra of the tempered and bent glazing are shown in the graph of FIG. 5 as three corresponding lines. Comparison of the spectral properties of the heat treated coated glass substrate of this Example with the comparably-coated, but not heat treated, glazing reveals that the spectral properties of the CuO$_x$ coating of the invention are substantially stable at high temperatures. The invention, of which these Examples provide non-limiting illustrations, provides an excellent thermostable, anti-solar coating for transparent or substantially-transparent substrate surfaces. Mechanical properties of the heat treated and as deposited samples were examined by Taber abraser. Sputter deposited NiN films are used as a reference of a hard coating to compare the adhesion/hardness of the CuO$_x$ films. The TiN filmsdeposited by the same coater/process are good for up to 500 cycles, whereas the CuO$_x$ films were good over 3000 cycles.

Humidity chamger tests were run for single and multilayer samples of the invention. After two weeks of testing, samples did not show any degradations, the humidity chamger test conditions were 95% humidity, 50° C. for two weeks. Resistance to radiation of the samples were examined after 100 hours exposure to UV radiation of a medium pressure mercury-vapor arc lamp operated at 50W. There were no changes observed on the samples after UV irradiation.

Additional Example—This example shows the production of a glazing panel having the thermostable CuO$_x$ coating of the invention, and additionally comprising a color-control layer. A series of glass panels was prepared, as in sample No. 1090 (220 Å thick CuO$_x$ film) above, except that a layer of SnO$_2$ 200–1100 Å thick eas deposited on top of the CuO$_x$ film. The SnO$_2$ layer was deposited from a pure Sn target at a power level of 2.2 KW, with a Ar/O ratio of 40 Sccm/82 Sccm, using from 2 passes for an SnO$_2$ layer (for an SnO$_2$ layer 220 Å thick) to 10 passes (for 1100 Å) at a travel speed of 2 m/min under deposition pressure of 2.5.10−3 mBarr. An approximately 200 Å increase of SnO$_2$ thickness leads to 4×200 Å (=800 Å) shift of extrema of the R, R' and T spectra to the longer wavelengths. For example, Rmin is at 3900 Å for CuO$_x$(220 Å)/SnO$_2$(440 Å) and at 4700 Å for the same 660 Å Sn$_2$O. Similarly, Rmin is at 5500 Å for 880 Å SnO$_2$. The corresponding reflection colors change from yellow (440 Å thick SnO$_2$) to purple (880 Å thick SnO$_2$).

Figure 6:
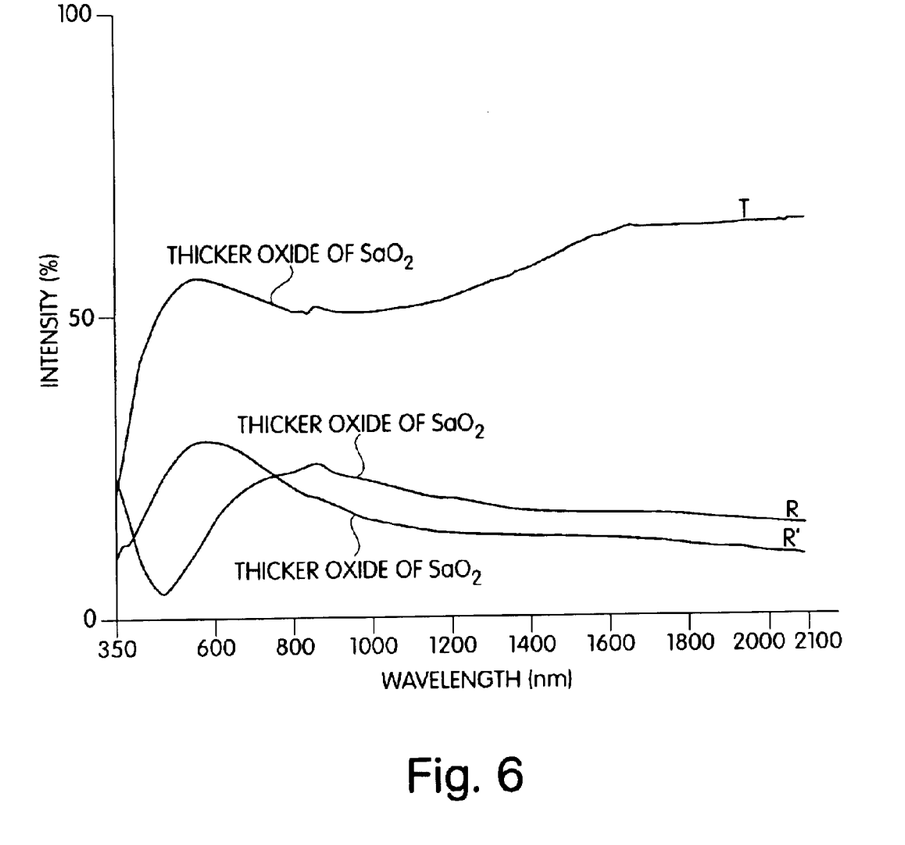
FIG. 6 are graphical representations of the spectral properties of various preferred embodiments (#1315 and #1095) described in Examples 3 and 4 respectively.

The reflection color of the double layer system shifts from green to orange with increasing thickness of the SnO$_2$ layer. The arrows in FIG. 6 indicate the shifts of T, R, and R' extrema with increasing SnO$_2$ thickness. Thus, the color at the glass (i.e., uncoated) side in a glass/SnO$_2$/CuO$_x$ system cna be controlled. Color is likewise controlled for a glass/SnO$_2$/CuO$_x$/SnO$_2$ embodiment of this invention. The R, R' and T spectra of the CuO$_x$-coated pane further comprising a color control layer, as described above, is presented in the graphs of FIG. 6 as three corresponding lines. Table 3 below shows spectral properties for two embodiments as described here. In the first embodiment, the glazing unit has a single pane wherein a layer of SnO$_x$ 660 Å thick is directly over a layer of CuO$_x$ 220 Å thick (X being about 0.7) on a soda-lime-silica glass pane 6 mm thick. In the record embodiment, such coated pane is used in a double pane glazing, spaced 12 mm from an uncoated 6 mm pane of soda-lime-silica glass. The coating was on Surface No. 2.

TABLE 3

|  | L | a | b |
|---|---|---|---|
| Single Pane |  |  |  |
| Transmittance | 79.6 | −2.6 | 6.61 |
| Reflectance | 58.4 | −2.9 | 12.6 |
| Double Pane |  |  |  |
| Transmittance | 75.9 | −3.9 | 6.57 |
| Reflectance | 60.8 | −3.1 | 12.6 |

The Tv/Ttotal sol. was 56/61 for the single pane embodiment and 50/51 for the double pane embodiment.

OTHER EMBODIMENTS

It will be apparent from the foregoing disclosure that alternative embodiments are possible within the scope of the invention, including, for example, modifications to the preferred embodiments described above.

I claim:

1. Thermostable glazing comprising a substantially transparent substrate with a substantially transparent, thermostable solar coating on a surface of the substrate, the substantially transparent, thermostable solar coating consisting essentially of sputter deposited copper oxide.

2. The thermostable glazing according to claim 1, wherein the substantially transparent, thermostable solar coating of copper oxide has a substantially uniform thickness from 150 Å to 2000 Å.

3. The thermostable glazing according to claim 1 wherein the substantially transparent, thermostable solar coating imparts coloration to the coated article.

4. The thermostable glazing according to claim 1 wherein the substantially transparent, thermostable solar coating lies directly on the surface of the substrate.

5. The thermostable glazing according to claim 1 wherein the substantially transparent substrate is substantially planar glass.

6. The thermostable glazing according to claim 5 wherein the substantially transparent substrate is a pane of a glass selected from the group consisting of soda-lime-silica glass, borosilicate glass, aluminosilicate glass, vycor, fused silica and vitreous silica.

7. The thermostable glazing according to claim 6, wherein the glass is soda-lime-silica glass.

8. The thermostable glazing according to claim 7, wherein the glass is a body colored glass.

9. The thermostable glazing according to claim 1, wherein the substantially transparent substrate is curvo planar, body colored soda-lime-silica-glass.

10. The thermostable glazing according to claim 1, further comprising a coloration coating layer.

11. The thermostable glazing according to claim 10, wherein the coloration coating layer is formed of SnO2, WO$_3$; ZnO, Zinc stannate, Bi$_2$O$_3$, or Si$_3$N$_4$.

12. The thermostable glazing according to claim 10, wherein the coloration coating layer forms an integrated coating with the thermostable solar coating.

13. The thermostable glazing according to claim 12, wherein the coloration coating layer lies adjacent the thermostable solar coating in the integrated coating.

14. The thermostable glazing according to claim 10, wherein the coloration coating layer has a substantially uniform thickness from 200 Å to 2000 Å.

15. Thermostable glazing comprising a substantially transparent, bent substrate with a substantially transparent, thermostable solar coating on a surface of the substrate, the substantially transparent, thermostable solar coating being applied to the surface by sputter deposition and consisting essentially of copper oxide.

16. Thermostable glazing comprising a substantially transparent substrate with a substantially transparent, thermostable solar coating on a surface of the substrate and a coloration coating layer, the substantially transparent, thermostable solar coating being applied to the surface by sputter deposition and consisting essentially of copper oxide.

17. Thermostable glazing comprising a substantially transparent substrate with a substantially transparent, thermostable solar coating on a surface of the substrate, the substantially transparent, thermostable solar coating being applied to the surface by sputter deposition and consisting essentially of copper oxide, wherein the substrate with the substantially transparent, thermostable solar coating has a visible transmittance of about 0.11 to 0.40.

* * * * *